June 29, 1926.  1,590,944

J. HEARTTAGEN

NONSKID AUTOMOBILE CREEPER

Filed August 15, 1925

John Hearttagen INVENTOR

BY Victor J. Evans ATTORNEY

WITNESS:

Patented June 29, 1926.

1,590,944

UNITED STATES PATENT OFFICE.

JOHN HEARTTAGEN, OF ALLENTOWN, PENNSYLVANIA, ASSIGNOR OF ONE-HALF TO JOSEPH F. CUSTARD, OF ALLENTOWN, PENNSYLVANIA.

NONSKID AUTOMOBILE CREEPER.

Application filed August 15, 1925. Serial No. 50,460.

This invention relates to non or anti-skid shoes for use in connection with motor vehicles to prevent vehicles from skidding over slick or icy surfaces which shoe is also adaptable for use in assisting the vehicle from becoming mired in a rut or soft place, in that by using the shoes on the rear driving wheels of the vehicle, a grip or bight upon the soft surface may be obtained to provide sufficient traction to permit the vehicle to advance.

Another object of the invention is to provide a shoe as specified, which may be made of sheet metal pressed into shape and which provides suitable abutments to prevent both circumferential and lateral sliding or skidding of a wheel as well as to provide a device which can be manufactured at a relatively low cost.

Other objects of the invention will appear in the following detail description, and in the accompanying drawings wherein:—

Figure 1:
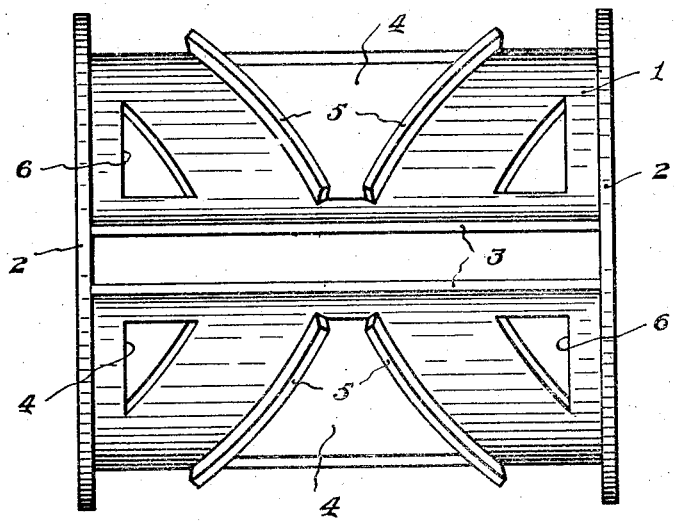
Figure 1 is a top plan of the improved non-skidding shoe.
Figures 2, 3:
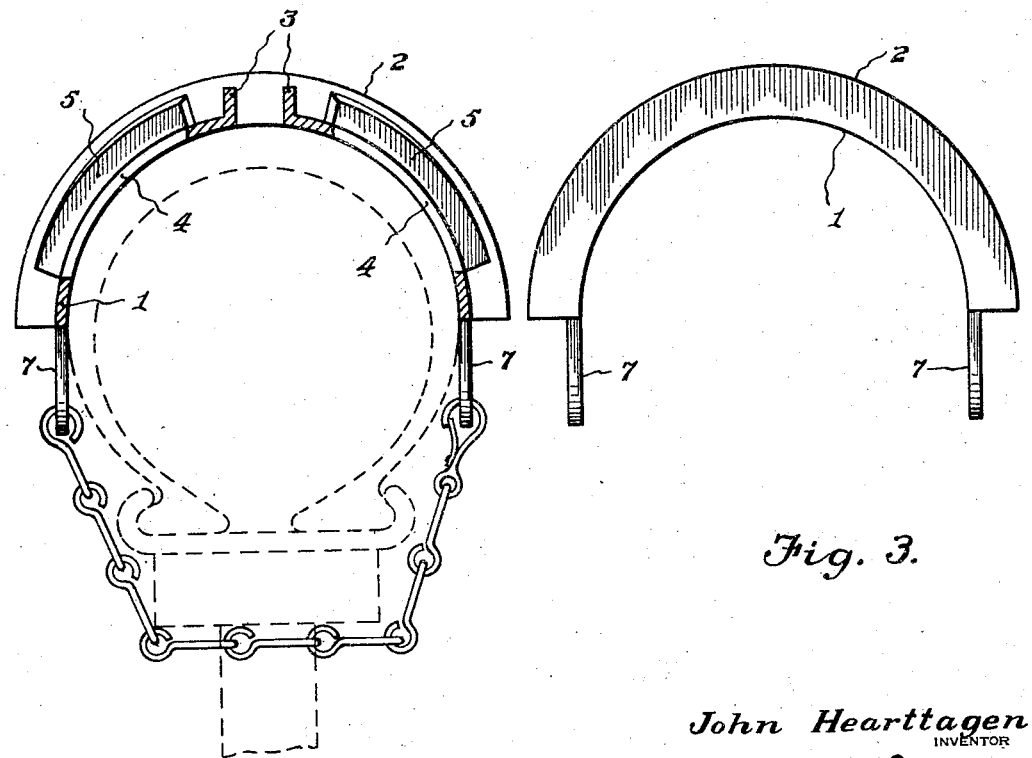
Figure 2 is a cross section showing the device applied to a cross section of a mounted tire.
Figure 3 is an end elevation of the creeper per se.

Referring more particularly to the drawings, the improved non-skid shoe comprises a substantially semi-cylindrical body 1 which is formed of sheet metal or other analogous material, and it has laterally extending flanges 2 bent outwardly at each end thereof and it is also provided with a pair of longitudinally extending ribs 3 spaced equi-distant from the longitudinal center of the body 1. The flanges 3 are formed by slitting the body 1 longitudinally, and bending the flanges outwardly. The body is also cut away to provide a pair of substantially triangular shaped openings 4, the edge portions of which are bent outwardly to provide diagonally extending flanges 5, which start a short distance inwardly from the edges of the body 1 and incline inwardly towards the transverse center of the body and towards the longitudinal center of the body as clearly shown in Figure 1 of the drawings. If it is so desired, the body may be provided with cut-out portions 6 provided for the purpose of decreasing its weight. A plurality of ears 7 are formed on the edges of the body and are adapted to have straps or analogous fastening means connected thereto to permit the attachment of the non-skid shoe to a motor vehicle tire.

From the foregoing description taken in connection with the accompanying drawings, it will be apparent that the various flanges 2, 3 and 5 present abrupt ground gripping surfaces transversely longitudinally and diagonally of the direction of travel of the vehicle wheel on which the shoe is mounted, thereby preventing both circumferential and lateral skidding of the vehicle as well as providing multiple surfaces for biting into a rut or soft surface.

It is, of course, to be understood, that the invention may be constructed in various other manners and the parts associated in different relations, and therefore, I do not desire to be limited in any manner, except as set forth in the claim hereunto appended.

What I claim:—

A non-skid shoe for vehicle wheels comprising a semi-cylindrical body having laterally bent flanges at each end and provided with a central slot extending throughout its entire length, a pair of laterally bent flanges along each edge of said central slot, said body provided with substantially triangular shaped cut-out portions one on each side of said central slot, and laterally bent flanges along the sides of said triangular openings extending towards the center.

In testimony whereof I affix my signature.

JOHN HEARTTAGEN.